(12) United States Patent
Pustelniak et al.

(10) Patent No.: US 6,279,687 B1
(45) Date of Patent: Aug. 28, 2001

(54) METHOD AND SYSTEM FOR DETECTING OBJECTS IN A DETECTION ZONE USING MODULATED MEANS

(75) Inventors: Richard D. Pustelniak; Teril W. Morton, both of Tucson, AZ (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/410,561

(22) Filed: Oct. 1, 1999

(51) Int. Cl.[7] .................................................. B66B 13/26
(52) U.S. Cl. ................................................ 187/317; 49/25
(58) Field of Search .................................. 187/316, 317, 187/291, 354; 49/25, 26, 28; 250/221, 222.1, 214 AL, 214 B, 208.3, 553

(56) References Cited

U.S. PATENT DOCUMENTS

| Re. 30,719 | 8/1981 | Mills ................................. 187/52 R |
| Re. 33,668 | * 8/1991 | Gray ..................................... 187/56 |
| 3,743,056 | * 7/1973 | Zitelli et al. ........................... 187/29 |
| 3,852,592 | 12/1974 | Scoville et al. ...................... 250/221 |
| 4,029,176 | 6/1977 | Mills ................................. 187/52 R |
| 4,736,097 | * 4/1988 | Phillip ................................. 250/221 |
| 4,794,248 | 12/1988 | Gray ................................... 250/221 |
| 4,851,746 | 7/1989 | Milke ................................. 318/467 |
| 4,894,952 | 1/1990 | Trett et al. ............................. 49/25 |
| 4,897,538 | * 1/1990 | Lemaire et al. ...................... 250/209 |
| 5,095,203 | * 3/1992 | Sato et al. .......................... 250/222.1 |
| 5,142,152 | 8/1992 | Boiucaner ............................ 250/341 |
| 5,149,921 | 9/1992 | Picado ................................. 187/130 |
| 5,173,750 | * 12/1992 | Laukaitis ........................... 250/252.1 |
| 5,243,181 | * 9/1993 | Bondarev et al. .................... 250/214 |
| 5,420,430 | 5/1995 | Trett .................................... 250/341 |
| 5,428,923 | * 7/1995 | Waggamon ............................. 49/28 |
| 5,567,931 | 10/1996 | Amend et al. ....................... 250/221 |
| 5,659,159 | * 8/1997 | Koopman, Jr. ....................... 187/394 |
| 5,698,824 | 12/1997 | Platt ................................... 187/317 |
| 5,886,307 | 3/1999 | Full et al. ............................ 197/317 |

FOREIGN PATENT DOCUMENTS 0 699 619 A2    3/1996    (EP) ............................. B66B/13/26

* cited by examiner

Primary Examiner—Jonathan Salata

(57) ABSTRACT

A system and an associated method of detecting an object in a three-dimensional field adjacent to a doorway, such as an elevator doorway, uses an array of energy emitters that emit three-dimensional energy signals into the field and an array of energy receivers that receive the energy signals reflected from the object. The signals are sampled a predetermined number of times. In one embodiment, if the lowest value sampled signal reaches a predetermined threshold, an object detection signal is generated. In an alternative embodiment, if the sampled signals are within a predetermined variance range, the object detection signal is generated. In another alternative embodiment, if a predetermined modulation code is detected within a sampled signal, the object detection signal is generated.

15 Claims, 3 Drawing Sheets

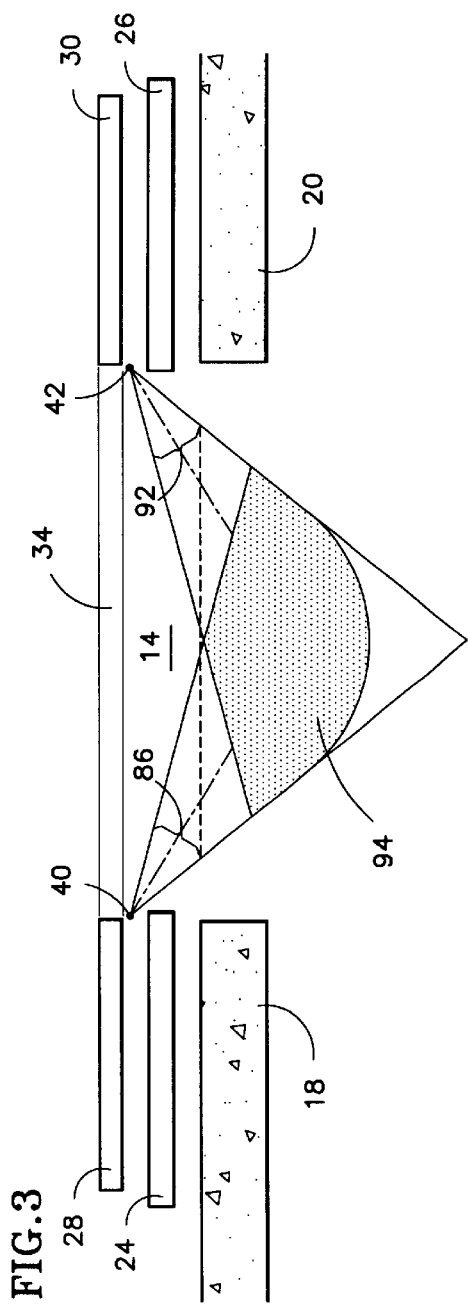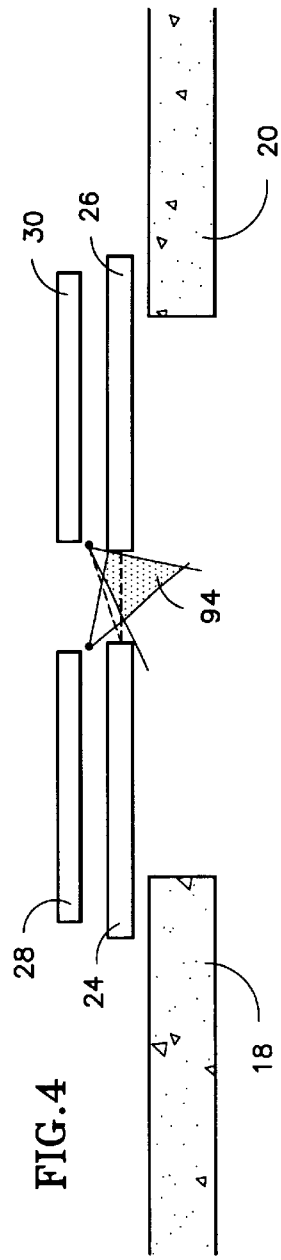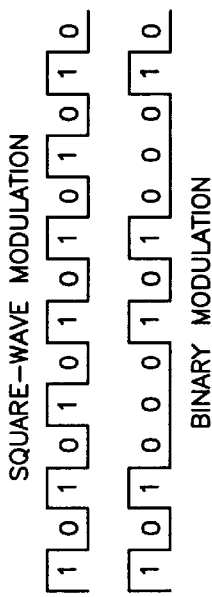

METHOD AND SYSTEM FOR DETECTING OBJECTS IN A DETECTION ZONE USING MODULATED MEANS

TECHNICAL FIELD

The present invention relates to elevators and, more particularly, to electronic safety detection systems for elevator doors.

BACKGROUND OF THE INVENTION

In elevator installations, many automatic sliding doors are equipped with safety systems designed to detect potential interference with the closing operation of the doors. Such safety systems typically include a plurality of signal emitter sources disposed on one door, and a plurality of signal receiver sources disposed on the other door. The signal emitters emit a curtain of signals across the threshold of the elevator door which are received by the signal receivers. When the curtain of signals is interrupted, the safety system communicates with a door controller in order to either stop the door closing operation and open the doors, or to maintain the doors in an opened position, depending on the current door position.

A doorway safety system is described in U.S. Pat. No. 4,029,176 (Mills) that utilizes acoustic wave transmitters and receivers to detect objects or persons within an area near the elevator doors. The system detects objects positioned between the doors and across the threshold, and extends the zone of detection into the entryway. The transmitters send out a signal at an angle into the entryway. When an obstruction enters the detection zone, the signal reflects from the obstruction and is detected by the receivers.

Another doorway safety system described in U.S. Pat. No, 5,886,307 (Full et al.) discloses a three-dimensional system for detecting objects across the threshold and in the entryway. The system projects a curtain of light beams across the threshold and illuminates the area directly in front of the entryway with three-dimensional detection beams. The system detects obstructions between the doors and across the threshold if an obstruction breaks one or more of the beams. In addition, if energy from the three-dimensional beams reflects off of an object in the entryway into the three-dimensional receivers, the obstruction is also detected.

The above-described system for three-dimensional detection has significant shortcomings. For example, while curtain-type detection systems require a "break" in one or more curtain beams to indicate an obstruction across a threshold, three-dimensional detection requires a "connect" to indicate an obstruction. This inverted logic for three-dimensional detection results in a sensitivity to external sources of energy that are not problematic in single-plane or curtain-type detection systems.

Systems that use light as the energy source for three-dimensional detection are subject to interference from a variety of external sources. For example, sources of light external to the detection system located near the elevator installation can inadvertently be picked up by the light sensors of the detection system. If the light from an external source is modulated similarly to that transmitted by the door safety system, it can be picked up and interpreted as indicative of an obstruction. Such external sources of light may include fluorescent lighting systems, emergency strobe lights, and emergency vehicle beacons.

External sources of impulse-type, electrical noise may also result in inadvertent obstruction signaling in three-dimensional door safety systems. Sources of this type of electrical noise include relay type elevator controllers, as well as electromechanical door operators.

OBJECTS AND SUMMARY OF THE INVENTION

It is an object of the present invention to provide an improved, three-dimensional door safety detection system for sliding doors.

It is another object of the present invention to provide a three-dimensional door safety detection system that is reliably operable in the presence of impulse-type electrical noise.

It is yet another object of the present invention to provide a three-dimensional door safety detection system that is reliably operable in the presence of external light sources, including sources that produce light energy having characteristics similar to the light energy produced by the detection system.

These objects and others are achieved by the present invention as described herein.

The present invention is directed to a three-dimensional door safety system for detecting objects or persons approaching or in a predetermined safety zone of open doors. A plurality of receivers or detectors are located on one door, and a plurality of emitters are located on the opposite door. The area directly in front of the closing doors is scanned for obstructions. The safety system detects objects in the entryway, while distinguishing from external energy that is not produced by the safety system. Generally, each beam produced by the energy emitters is sampled. The amplitude of each respective beam is stored. The amplitudes are each compared to a predetermined detection threshold level to determine the presence or absence of objects in the detection area.

The first embodiment of the present invention takes into account the transitory nature of interference energy, where the interference is present for a very short period, then becomes undetectable. In this embodiment, each three-dimensional beam is sampled multiple times per door scan frame. The value of the smallest amplitude sample acquired is compared with the detection threshold level to determine the presence or absence of objects in the three-dimensional detection area. This embodiment effectively ignores most impulse-type interference, such as electrical noise spikes, and light produced by strobe lamps.

A second embodiment of the present invention also accounts for the transitory nature of interference energy. In this case, however, the interference energy continues to be detectable beyond the high amplitude portion of the interference signal. In this embodiment, each three-dimensional beam is sampled multiple times per door scan frame. The value of each sample is stored for the respective beam. Detection energy, reflecting from an object in the three-dimensional detection area should present a generally constant, i.e., within a predetermined maximum variance range, amplitude from sample to sample, within a single scan frame, for any particular beam. If the samples for any particular beam do not present this constant signature, the energy for that beam is considered to be interference energy and is ignored. This embodiment improves the discrimination capability of the first embodiment by providing the ability to ignore interference energy that is continuously detectable but inconsistent in amplitude, such as the light produced by some fluorescent lighting systems.

A third embodiment of the present invention assigns an identifier to the emitted energy to provide the ability to reject interference energy that is both continuously detectable and consistent in amplitude. In this embodiment, each three-dimensional beam is sampled a single time per door scan frame while the transmitted energy is produced with unique, verifiable modulation, i.e., a modulation code, that can be validated by the detection receiver. If the modulation code is detected in the sampled beam, a signal is generated indicating the presence of an object. If the modulation code of the detected energy received for a particular beam is not verified by the receiver, the detected energy for that beam is ignored, as interference energy, regardless of its amplitude. This embodiment provides the ability to reject interference energy that cannot be rejected by the first and second embodiments because the interference energy is continuously detectable and relatively constant in amplitude, such as light produced by some fluorescent lighting systems.

Alternate embodiments of the present invention could use various combinations of the approaches described above with respect to the three preferred embodiments. By combining the various approaches, the ability to discriminate between target detection energy and interference energy from external sources is enhanced.

Because of the sensitivity to external sources of light and impulse noise introduced by the addition of three-dimensional detection capability to door safety systems, some prior art systems are rendered inoperable under various conditions. Such conditions include elevator installations that utilize relay-type controllers, fire alarm systems that utilize strobe lights, installations in the vicinity of emergency vehicle beacons (i.e., hospitals), and installations near fluorescent lighting systems. The present invention provides a system that is reliably operable in such environments and, thus, more safe and economically operable.

BRIEF DESCRIPTION OF THE DRAWINGS

FIG. 3 is a schematic, partial plan view of a system according to FIG. 1.

FIG. 4 is a schematic, partial plan view of a system according to FIG. 1.

FIG. 5 is a schematic representation of a binary modulation code in accordance with the present invention.

DESCRIPTION OF THE PREFERRED EMBODIMENTS

Figure 1:
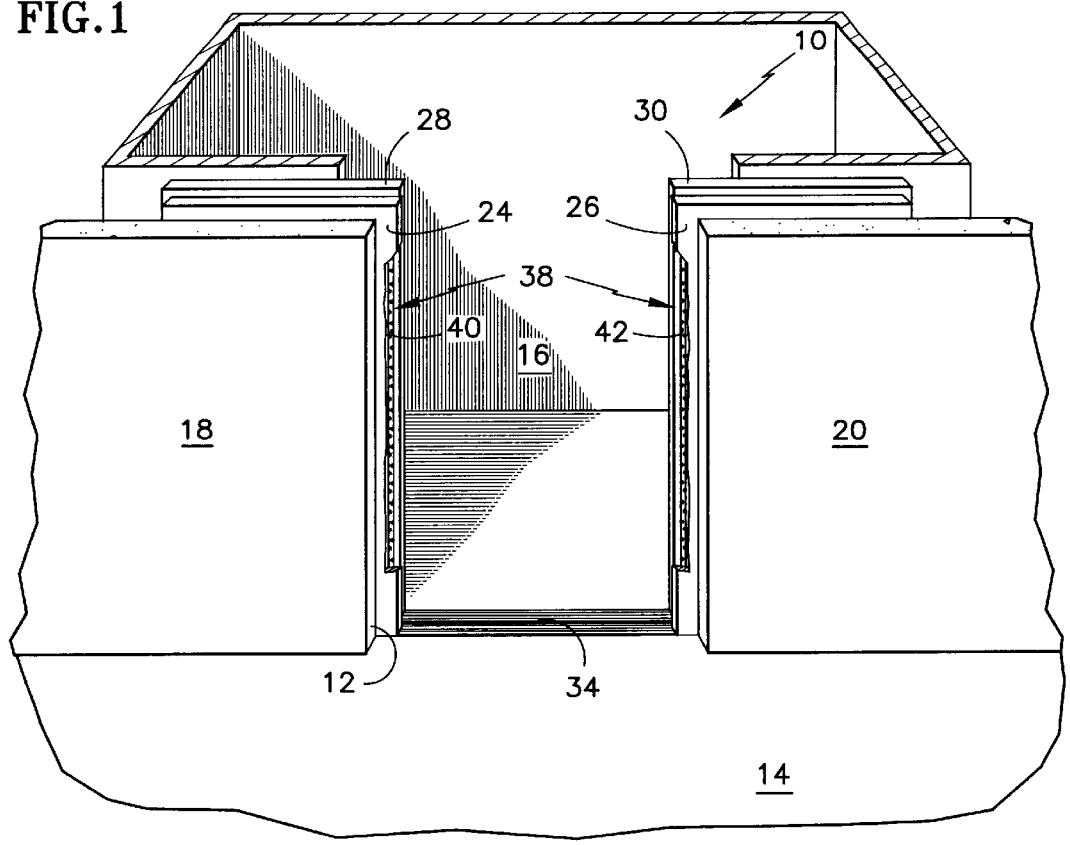
FIG. 1 is a schematic, partial front view of a system according to the present invention.

A system according to the preferred embodiments of the present invention door safety system (10) for opening and closing a doorway (12) of an elevator car (16) adjacent to a hallway (14) and walls (18, 20) is shown in FIG. 1. A set of hallway doors (24, 26) and a set of elevator car doors (28, 30) are shown. Both sets of doors (24, 26, 28, 30) slide open and closed together across a threshold (34) with the hallway doors (24, 26) closing and opening slightly ahead and behind, respectively, of the elevator car doors (28, 30). A safety detection system (38) is installed on the elevator car doors (28, 30) adjacent to the hallway doors (24, 26). The safety detection system (38) includes a transmitter stack (40) and a detector stack (42), each disposed on opposite sides of the doorway (12) and facing each other.

Figure 2:
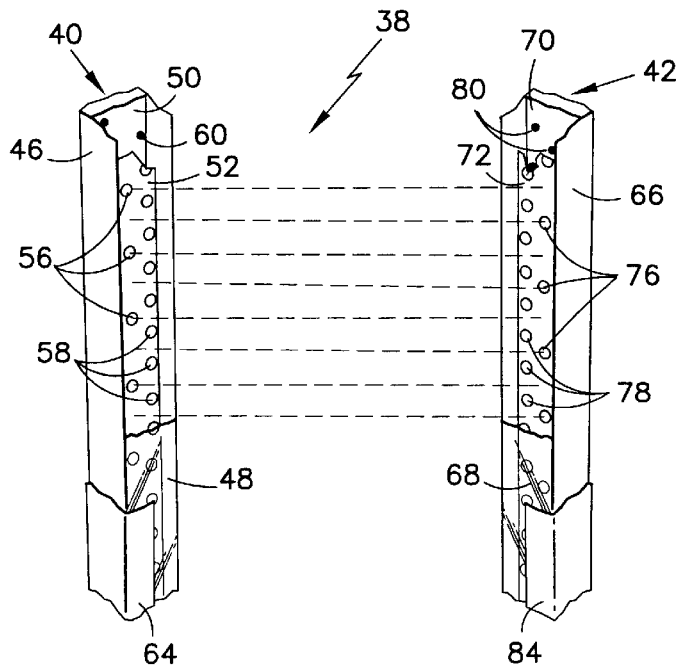
FIG. 2 is a schematic, partial view of a component of the system according to FIG. 1.

As shown in FIG. 2, each transmitter stack (40) includes a housing (46) and a transparent cover (48) for protecting a transmitter circuit board (50) and a transmitter lens board (52). The transmitter lens board (52) includes a plurality of three-dimensional transmitter lenses (56) and a plurality of curtain transmitter lenses (58). The transmitter circuit board (50) includes a plurality of transmitters or light emitting diodes (LEDs) (60) disposed adjacent to each lens (56, 58) for emitting infrared light. A transmitter barrier (64) supports the housing (46) and partially blocks light for the three-dimensional transmitter lenses (56).

The detector stack (42) is structured as a mirror image of the transmitter stack (40). The detector stack (42) includes a detector stack housing (66) having a transparent detector stack cover (68) for protecting a detector circuit board (70) and a detector lens board (72). The detector lens board (72) includes a plurality of three-dimensional detector lenses (76) and a plurality of curtain detector lenses (78). The curtain detector lenses (78) are disposed directly across from the curtain transmitter lenses (56). The detector circuit board (70) includes a plurality of detectors or photodiodes (80) adjacent to each lens (76, 78) for detecting reflected light. A detector barrier (84) supports the detector housing (66) and partially blocks light for the three-dimensional detector lenses (76).

The safety system (38) includes a controller (77) that provides and controls power to the stacks (40, 42), sequences and controls the signals to the stacks (40, 42), and communicates with a door controller (79).

The controller (77) contains data acquisition and data processing circuitry, including a power supply, analog to digital converter, and microprocessor. The microprocessor, e.g., the model 68HC11 from Motorola, or other such commercially available microprocessors, further includes programmable memory for defining a executable program to detect potential interference with the elevator doors.

In operation, the safety system (38) prevents the elevator car doors (28, 30) from closing if an object or person is detected either across the threshold (34) or approaching the doorway (12). The curtain transmitter lenses (58) emit a signal across the threshold (34) to the curtain detector lenses (78). If the curtain signal is interrupted when the doors (28, 30) are either open or closing, the safety system (38) communicates with the door controller (79) to either maintain the doors (28, 30) open or reverse the closing operation, respectively.

The three-dimensional transmitter lenses (56) emit a three-dimensional signal at a predetermined angle outward into the hallway (14), as shown in FIG. 3 and FIG. 4. The detectors (80) and the three-dimensional detector lenses (76) receive a signal emitted from the three-dimensional transmitter lenses (56) and reflected from an object at a predetermined angle. The intersection between the field of view (86) of the three-dimensional transmitter lenses (56) and the field of view (96) of the three-dimensional detector lenses (76) defines a detection zone (94). When an object or a person enters the detection zone (94), a signal from the three-dimensional transmitter lenses (56) hits the obstruction and is reflected into the three-dimensional detector lenses (76). When the three-dimensional detector lenses (76) receive a signal, the safety system (38) processes the received signal to determine if the signal represents the detection of an obstruction. If so, the safety system (38) communicates with the door controller (79) to either reverse the closing operation or maintain the doors (28, 30) open.

During operation, the safety system (38) continuously scans the door opening and responds to any detected obstructions on a frame-by-frame basis. Each scanner frame consists of two phases: a data acquisition phase; and a data processing phase.

For the purposes of the following discussion, the term "beam" refers to the signal emitted from a curtain transmitter lens (58) or from a three-dimensional transmitter lens (56).

In the data acquisition phase, each curtain and three-dimensional beam is sampled, and the resulting beam data is stored. Curtain beams are sampled only once per scan frame while three-dimensional beams may be sampled more than once per frame, as required by specific embodiment of the present invention. A single sample of any particular beam, whether curtain or three-dimensional, is completed in a maximum time period of 750 µSec.

In the data processing phase, the beam data, accumulated during the data acquisition phase, is processed to determine if an obstruction has been detected. Signals are sent to the door controller (79) indicating the presence or absence of door obstructions.

An individual beam is sampled in the following manner. First, the transmitter for the beam is activated. The emitted energy signal is modulated, to enable the detection circuitry to reject light from external sources (such as sunlight or light from incandescent bulbs). The type of modulation used is determined by the specific embodiment of the present invention. After the transmitter for the beam has been activated, the receiver for the beam is enabled to receive the transmitted signal. Any detected signal, is processed through various circuits (gain selection, filtering and rectification). The resulting signal is sent to an integrator stage. The integrator output starts at a reference voltage and ramps in the negative direction. The integrator output signal is then sent to a voltage comparator stage, where it is compared to a fixed hardware threshold voltage. When the integrator output ramps below the hardware threshold voltage, the comparator produces an "end-of-integration" signal. The time, from the start of integration to the "end-of-integration" signal, is a direct representation of the strength of the received beam signal. Shorter integration times indicate stronger detected beam signals. This time (or strength) value is then stored for the beam being sampled. If an end-of-integration signal is not produced within the 750 µSec maximum sampling time, a "no-detect" condition is determined for the beam being sampled.

Figure 6:
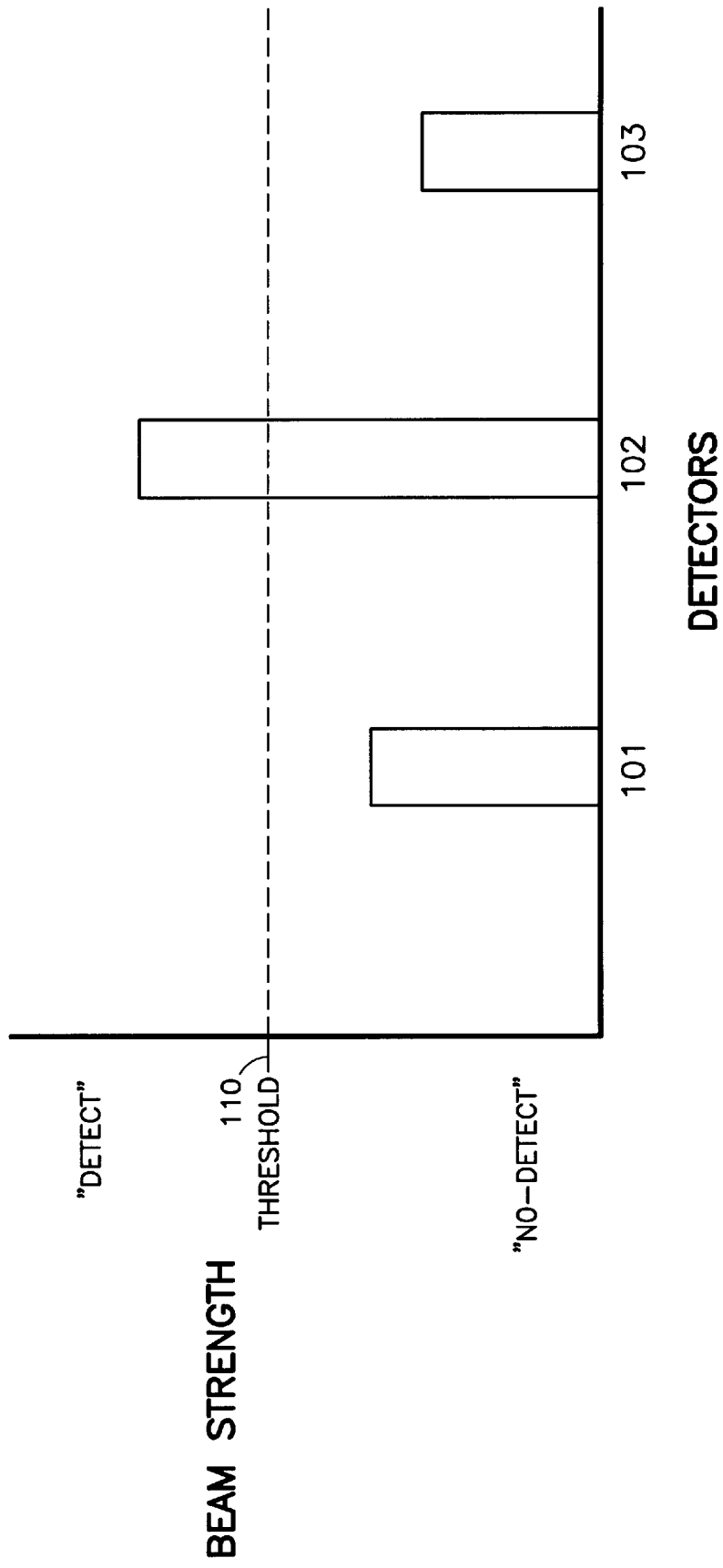
FIG. 6 shows a graphical representation of the detection and threshold beam strength values for a plurality of detectors.

The data processing phase essentially consists as illustrated in FIG. 6, of comparing the beam strength values 101, 102, 103, accumulated during the data acquisition phase, to a predetermined detection threshold value 110. If the detected signal for any three-dimensional beam 102 exceeds the threshold value 110, a signal is sent to the door controller (79), indicating the detection of an obstruction.

In the first embodiment of the present invention, the transmitted beam signals are modulated with a continuous stream of square waves at a fixed frequency and each three-dimensional beam is sampled multiple times in each scan frame. Only the value for sample containing the smallest beam strength value is actually stored for any particular beam. Normal data processing takes place as previously described. The interference rejection provided by this embodiment is essentially provided entirely during the data acquisition phase of a scan frame, making this the simplest and fastest embodiment of the three discussed in this document.

In the second embodiment of the present invention, as in the first embodiment, the transmitted beam signals are modulated with a continuous stream of square waves at a fixed frequency and each three-dimensional beam is sampled multiple times in each scan frame. Unlike the first embodiment, the beam strength value for each sample is stored for each respective beam. During the data processing phase, the beam strength for each individual beam is validated, by comparing the strength values from each sample for that beam. Generally constant beam strength values, i.e., values within a predetermined maximum variance range, indicate valid beam signal reception, while significant variation between samples is indicative of the presence of interference energy. If the samples taken for a particular beam indicate the presence of interference energy, the signal received for that particular beam is ignored. However, if the samples taken for that beam indicated valid beam signal reception, and the smallest beam strength value is greater than the detection threshold, obstruction detection is indicated. The data for each three-dimensional beam is processed in like manner.

In the third embodiment of the present invention, the transmitted beam signals are modulated with a specific, repeating, binary code, at a fixed bit rate, rather than a simple square wave modulation. Referring to FIG. 5, an exemplary embodiment of a binary modulation code, as compared to a continuous square wave modulation, is illustrated. Each three-dimensional beam is sampled only once per scan frame. During the data acquisition phase, while the strength of any individual beam is being sampled, the binary modulation code of the received signal is verified, by monitoring the polarity of the received signal with a port pin of the CPU (central processing unit). If the binary modulation code is not verified, the detected signal is determined to be from a source external to the system and a "no-detect" level is stored for that beam. If the beam signal does contain the correct modulation code, a value representing its beam strength is stored for that beam, as previously described. The data processing phase takes place normally, as previously described. Even though a binary modulation code is described in the specification, it will be apparent to one skilled in the art that other modulation codes may also be used, e.g., a frequency modulated code.

Because of the sensitivity to external sources of light and impulse noise introduced by the addition of three-dimensional detection capability to door safety systems, some systems are rendered inoperable under various conditions. Such conditions include elevator installations that utilize relay-type controllers, fire alarm systems that utilize strobe lights, installations in the vicinity of emergency vehicle beacons (i.e., hospitals), and installations near fluorescent lighting systems. The present invention provides a system that is reliably operable in such environments and, thus, more safe and economically operable.

While the preferred embodiments of the invention have been herein described, it is understood that modification and variation may be made without departing from the scope of the presently claimed invention.

What is claimed is:

1. A method of detecting an object in a zone of detection using a plurality of pairs of three dimensional energy emitters and receivers, wherein the emitters emit energy beams in a predetermined angle at the object and the receivers sense the energy beams reflected from the object, the method comprising:

sampling a reflected energy beam of an emitter receiver pair a predetermined number of times to provide a set of strength signals indicative of the strength of the reflected energy;

comparing the lowest value strength signal of the set of strength signals to a predetermined threshold value; and generating an object detection signal when the lowest value strength signal reaches the predetermined threshold value.

2. The method of claim 1 further comprising:

determining a variance range for the set of strength signals;

comparing the variance range for the set to a predetermined maximum variance range; and generating the object detection signal when the variance range is within the predetermined maximum variance range.

3. The method of claim 1 further comprising:

modulating an emitted energy beam of the emitter receiver pair with a predetermined modulation code;

detecting presence of the modulation code within the sampled energy beam; and generating the object detection signal when the modulation code is detected.

4. The method of claim 2 further comprising:

modulating an emitted energy beam of the emitter receiver pair with a predetermined modulation code;

detecting the presence of the modulation code within the sampled energy beam; and generating the object detection signal when the modulation code is detected.

5. The method of claim 1 wherein the sampling further comprises:

sampling the reflected energy beam to provide a resultant signal;

integrating the resultant signal for a predetermined period of time to provide an integrator output signal;

comparing the integrator output signal to a predetermined minimum detectable threshold value; and generating an end of integration signal when the minimum detectable threshold value is reached.

6. The method of claim 1 further comprising:

providing a plurality of pairs of curtain energy emitters and receivers, wherein the emitters emit a curtain of energy beams directly at each corresponding receiver;

sampling a directly emitted energy beam of a curtain emitter receiver pair to provide a curtain signal indicative of the absence of an object within the curtain; and generating a second object detection signal when the curtain signal is interrupted.

7. The method of claim 1 wherein the emitter receiver pair further comprises every emitter receiver pair of the plurality of pairs of energy emitters and receivers.

8. The method of claim 1 wherein the plurality of pairs of three dimensional energy emitters and receivers are mounted on opposing doors of an elevator car.

9. The method of claim 3 wherein the modulation code comprises a binary code.

10. A system for detecting an object in a zone of detection comprising:

a plurality of pairs of three dimensional energy emitters and receivers, wherein the emitters emit energy beams in a predetermined angle at the object and the receivers sense the energy beams reflected from the object;

a controller responsive to signals from the receivers, the controller having data acquisition and data processing circuitry for, sampling a reflected energy beam of an emitter receiver pair a predetermined number of times to provide a set of strength signals indicative of the strength of the reflected energy;

comparing the lowest value strength signal of the set of strength signals to a predetermined threshold value; and generating an object detection signal when the lowest value strength signal reaches the predetermined threshold value.

11. The system of claim 10, wherein the data acquisition and data processing circuitry further comprises circuitry for:

determining a variance range for the set of strength signals;

comparing the variance range for the set to a predetermined maximum variance range; and generating the object detection signal when the variance range is within the predetermined maximum variance range.

12. The system of claim 10, wherein the data acquisition and data processing circuitry further comprises circuitry for:

modulating an emitted energy beam of the emitter receiver pair with a predetermined modulation code;

detecting presence of the modulation code within the sampled energy beam; and generating the object detection signal when the modulation code is detected.

13. The system of claim 11, wherein the data acquisition and data processing circuitry further comprises circuitry for:

modulating an emitted energy beam of the emitter receiver pair with a predetermined modulation code;

detecting presence of the modulation code within the sampled energy beam; and generating the object detection signal when the modulation code is detected.

14. The system of claim 10 wherein the plurality of pairs of three dimensional energy emitters and receivers are mounted on opposing doors of an elevator car.

15. The system of claim 10 wherein the data acquisition and data processing circuitry further comprises a microprocessor responsive to the signals from the receiver, and having memory for storing signals including signals for defining an executable program for generating the object detection signal.

* * * * *